May 11, 1926.
J. R. KELLER
1,583,932
METHOD AND APPARATUS FOR FEEDING MOLTEN GLASS
Filed June 26, 1923 2 Sheets-Sheet 1
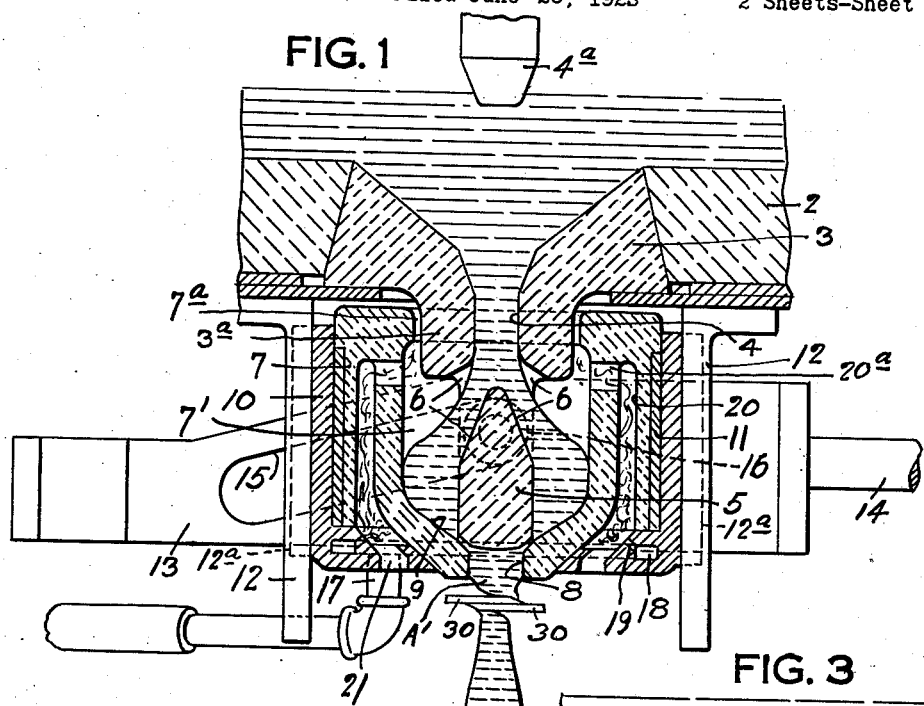
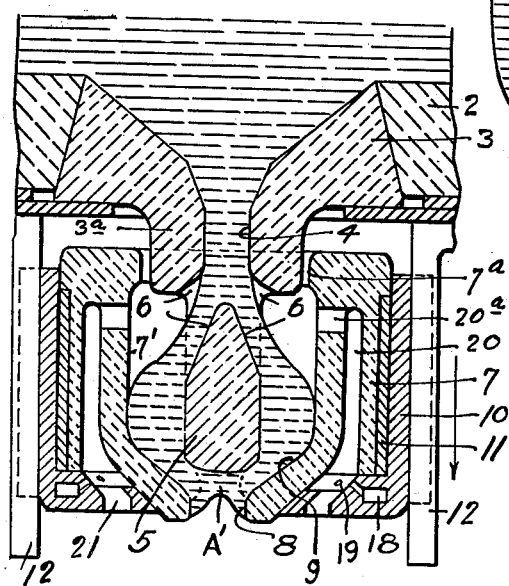
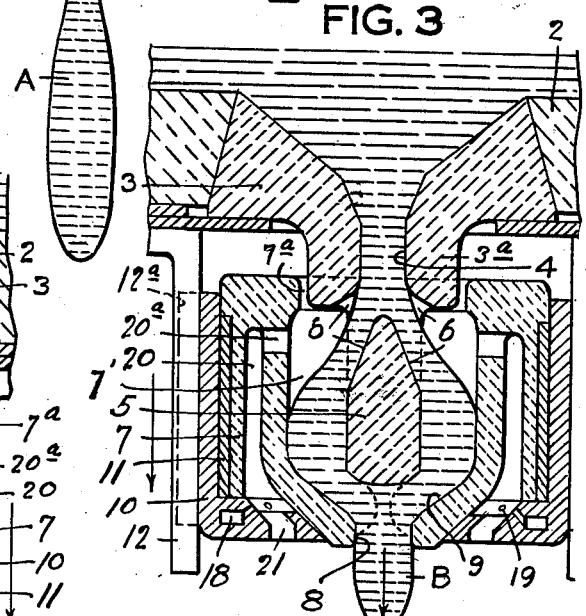
WITNESSES
INVENTOR
John R. Keller May 11, 1926.
J. R. KELLER
1,583,932
METHOD AND APPARATUS FOR FEEDING MOLTEN GLASS
Filed June 26, 1923  2 Sheets-Sheet 2
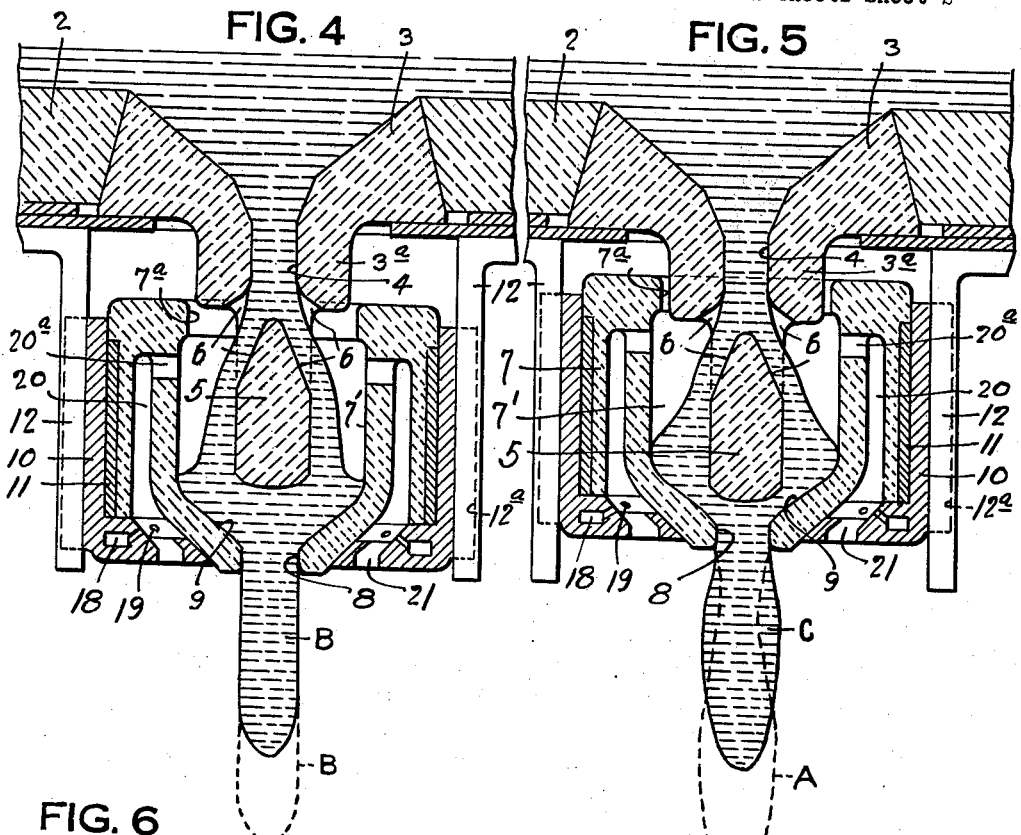
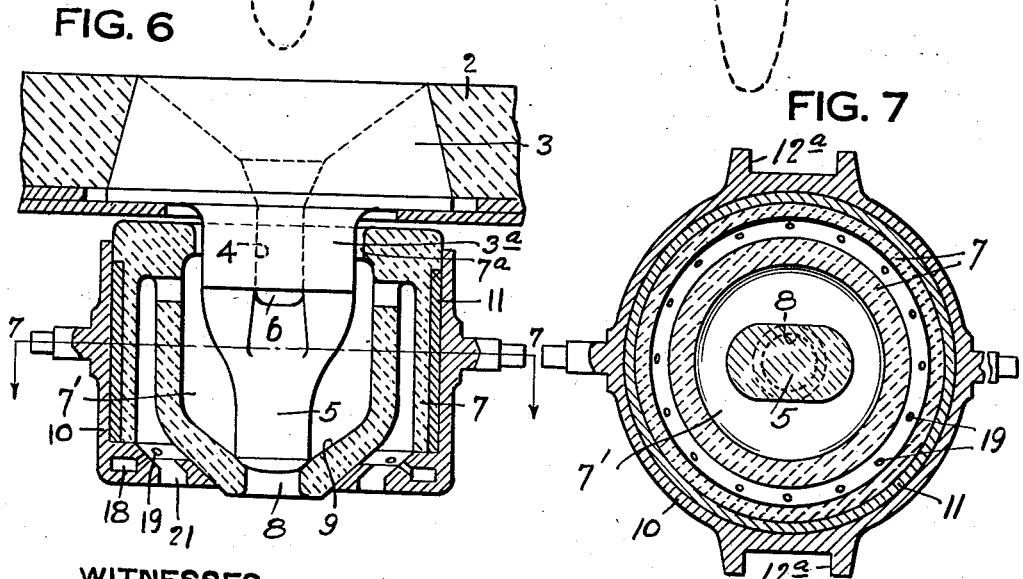
WITNESSES
INVENTOR Patented May 11, 1926.

1,583,932

UNITED STATES PATENT OFFICE.

JOHN R. KELLER, OF GLENSHAW, PENNSYLVANIA, ASSIGNOR TO HARTFORD-EMPIRE COMPANY, OF HARTFORD, CONNECTICUT, A CORPORATION OF DELAWARE.

METHOD AND APPARATUS FOR FEEDING MOLTEN GLASS.

Application filed June 26, 1923. Serial No. 647,839.

The invention is a method and means of flowing and feeding molten glass, whereby charges of the molten metal may be fed or delivered to molds or other translating devices.

Some of the objects and advantages obtained by the invention are: Positive control of flow and formation of the charge under varying conditions of glass temperature, head pressure and of time and shape requirements; mixing of the metal, the elimination of stratification and the chill at the shear point and occluded air or gas pockets; attenuation of the charge at the shearing plane, to reduce shear area, without modifying other predetermined characteristics of the gob or charge; and simple and novel means for carrying out the method.

Generally stated, the invention consists in a method of and means for flowing, controlling, shaping and delivering charges of glass for molds or other devices, principally by means of positive forces under flexible control.

In the drawings, Figure 1 is a sectional view of a portion of the forehearth of a glass tank or furnace and apparatus embodying my invention and for carrying out the method thereof; Figures 2, 3, 4 and 5 are similar views showing various positions of the parts during operation of the device and the various steps or stages in method of flowing glass; Figure 6 is a similar but transverse view, and Figure 7 is a horizontal sectional view on the line 7—7 of Figure 6.

The invention can be applied to any glass tank or forehearth or other holding receptacle, but the drawings herein show only a portion of a forehearth 2, provided with a sleeve or thimble 3 set into the bottom wall and having an outlet orifice 4. The thimble 3 has a depending post-like projection or valve stem 5, and the outlet orifice 4 extends transversely through this post, as at 6. A plunger or plug 4ª is shown in Figure 1, for closing the orifice 4 when it is desired to stop flow of glass from the forehearth.

A vertically reciprocating cup or collector box 7 surrounds the post 5 and this cup has a discharge or delivery orifice 8 in the bottom thereof, this orifice being adapted to be closed by the lower end of the post 5, as hereinafter described. The cup chamber 7¹ is walled to form the sloping or inclined lower surface 9 to the outlet orifice, and in the specific construction shown the depending portion 3ª of the thimble 3 is surrounded by the top portion or wall 7ª of the cup. The cup is preferably formed of refractory material surrounded by a metal jacket or frame 10 between which and the refractory material is an insulating wall 11. The jacket 10 forms means for mounting or supporting the cup between vertical guides or ways 12 on which the cup reciprocates by reason of co-operating guide-ways 12ª carried by the jacket 10, as shown in Figures 1 to 5 and 7.

The cup may be reciprocated or lowered and raised on its guides 12 by any suitable means. By way of illustration I have shown one side of a frame 13 having a shaft or rod 14 for connection with any suitable actuating means and inclined ways or cam slots 15 engaged by roller-trunnions 16, diametrically journalled on the wall or pocket 10 of the cup. Horizontal reciprocation of this frame 13, as will be seen, will lower and raise the cup through action of the angular cams 15 on the roller-trunnions 16.

In Figure 1 I show a gas connection 17 and an air chamber 18 having passage ways 19 to a fire chamber 20 which opens at 20ª into the top of the cup chamber, and by means of which I may heat the cup and glass charge when desired to control the temperature of the charge in the cup, as hereinafter set forth. Air openings to the fire chamber are indicated at 21, at the bottom of the cup.

When the cup is up or in the position shown in Figure 1, there may be a mere film of glass between the post 5 and the cup opening 8. It will be understood that the glass flows by gravity into the cup through the tank orifice 4 leading through the post 5 at 6, and that movement of the cup is timed. When the cup lowers, the bottom on the outlet orifice 8 thereof moves away from the post 5 and the glass which lowers with the cup flows out of this orifice, there being a surplus or excess of the glass within the cup, as the glass from the tank or forehearth feeds into it continuously, subject to control of the top plunger 4ª. In Figures 2 and 3 the cup is starting to lower and the charge or gob formation B is flowing from the cup for the making of the desired charge (A, Figures 1 and 5). When the cup has reached its lower position it is reversed and moved upward and the cup opening then approaches the post 5, causing a downward impulse to be given to the outflowing charge. The impulse or application of pressure thus given the charge forces it out in an elongated drop-like shape or form, as indicated in Figure 1 at A, and when the cup has moved up again to the position shown in Figure 1, the charge is then severed (as by the shears 30—30) and when, thereafter, the cup again starts to lower, the severed or stub end of the glass in the cup which has been in contact with the shears, is drawn or sucked up, by reason of such lowering, into the discharge orifice of the cup and the chilled glass beneath the post is momentarily held there by such action and is thus amalgamated with the hot glass within the cup or the incoming glass flowing to the discharge orifice and surrounding the stub end.

It will be seen that I am enabled to flow a large or small charge from the same feeder or cup simply by varying the speed or time of reciprocation, and that I obtain a positive force which shapes the charge. By reason of this action and control and of the fact that the glass may be kept hot at the point where the charge is formed, by the heating arrangement shown, I am enabled to control the character of the charge with respect to varying conditions of temperature and shape, volume and delivery requirements.

It will also be understood that the amount of glass or character of the charge is determined by the time interval that the cup rests in its lower position, or by the speed of movement of the cup. Thus when the speed is slow and the glass hot, a larger amount of metal will run out than when the speed is relatively slower and the glass temperature lower. In either or any case, as the lowered cup rises, the flowing glass between the post and the delivery orifice will be forced out and by increasing or decreasing or varying the speed of movement of the cup, progressively or otherwise, on its return, an impulse is given or force applied to the issuing glass, which may be so applied or controlled by the cup movement as to give definite form to the gob or charge. Thus not only may the body of the charge be shaped as desired, but the charge at the point of shearing may be reduced in area to overcome extended chill, and without necessarily making a wholly attenuated charge,—as, a quick return movement of the cup at the end of the stroke will cause a thinning out of the glass at the shear point. Reciprocation of the cup thoroughly mixes the glass at the point of charge formation and this mixing, together with the heating of the charge of the cup, overcomes stratification of the glass due to varying temperature at the tank.

I do not desire to limit myself to the form of apparatus shown and described, nor to any part thereof. Thus it will be apparent to those skilled in the art that the opening of the tank may be the usual bushed opening in the forehearth of the tank and that the post may be solid and that I am not limited to a vertically reciprocating cup and that the cup may be rotated about the fixed post or an auxiliary or other device to assist in mixing the glass in the cup.

Having thus described my invention, what I claim and desire to secure by Letters Patent is:

1. Apparatus for feeding molten glass, comprising a container for the glass having a downwardly opening discharge outlet, means for supplying glass continuously to said outlet, a vertically reciprocable cup disposed beneath said outlet and having a discharge opening in vertical alignment with the discharge outlet of said container, and a stationary post having its lower end in vertical alignment with the discharge outlet of said cup and adapted to cooperate with said opening to control the periodic discharge of glass through said opening.

2. Apparatus for feeding molten glass, comprising a container for the glass having a downwardly opening discharge outlet, means for supplying glass continuously to said outlet, a vertically reciprocable cup disposed beneath said outlet and having a discharge opening in vertical alignment with the discharge outlet of said container, a stationary post associated with said cup and having its lower end in vertical alignment with the discharge opening of said cup, the said post having passages for the discharge of glass laterally into said cup.

3. Apparatus for feeding molten glass, comprising a container for the glass having a downwardly opening discharge outlet, means for supplying glass continuously to said outlet, and having a discharge opening in vertical alignment with the discharge outlet of said container, a stationary post associated with said cup and having its lower end in vertical alignment with the discharge opening of said cup, the said post having at its upper end a hollow bore communicating with the discharge outlet from said container, and having lateral openings communicating with said bore for discharging glass laterally into said cup.

4. Apparatus for feeding molten glass, comprising a container for the glass having a downwardly opening discharge outlet, means for supplying glass continuously to said outlet, a vertically reciprocable cup disposed beneath said outlet and having a discharge opening in vertical alignment with the discharge outlet of said container, a stationary post associated with said cup and having its lower end in vertical alignment with the discharge opening of said cup, and means for externally heating said cup.

5. Apparatus for feeding molten glass, comprising a container for the glass having a downwardly opening discharge outlet, means for supplying glass continuously to said outlet, a vertically reciprocable cup disposed beneath said outlet and having a discharge opening in vertical alignment with the discharge outlet of said container, a stationary post associated with said cup and having its lower end in vertical alignment with the discharge opening of said cup, guideways for guiding the vertical movement of said cup, a trunnion carried by said cup and carrying a cam roller and a horizontally reciprocable cam cooperating with said roller to raise and lower said cup.

6. Apparatus for feeding molten glass, comprising a container for the glass having a downwardly opening discharge outlet, means for supplying glass continuously to said outlet, a vertically reciprocable cup disposed beneath said outlet and having a discharge opening in vertical alignment with the discharge outlet of said container, a stationary post associated with said cup and having its lower end in vertical alignment with the discharge opening of said cup, and a vertically adjustable plug for regulating the flow of glass through the outlet of said container.

7. Apparatus for feeding molten glass, comprising a container for the glass having a downwardly opening discharge outlet, means for supplying glass continuously to said outlet, a vertically reciprocable cup disposed beneath said outlet and having a discharge opening in vertical alignment with the discharge outlet of said container, a stationary post below said container outlet and having its lower end in vertical alignment with the discharge outlet of said cup, the said post having at its upper end a hollow bore communicating with the outlet from said container and having lateral openings communicating with said bore for discharging glass laterally into said cup, means for externally heating said cup, guideways for guiding the vertical movement of said cup, and a horizontally reciprocable cam connected to raise and lower said cup.

8. Apparatus for feeding molten glass, comprising means for establishing a continuous downward flow of molten glass, a receptacle for receiving the said glass, the said receptacle having a discharge opening disposed in vertical alignment with said initial continuous stream, means for applying an expulsive impulse to the glass in said receptacle and for then shutting off the flow of glass through said opening, and shears for severing mold charges from the glass discharged from said opening.

9. The method of feeding molten glass that comprises establishing a stream of glass continuously flowing downward into a receptacle, periodically accumulating glass from said stream in said receptacle, discharging the glass from said receptacle in the intervals between such accumulations and through an opening disposed in vertical alignment below the said initial continuous stream and around a stationary discharge controlling implement disposed within said receptacle periodically reciprocating said receptacle vertically, and severing mold charges from the glass discharged from said receptacle.

10. The method of feeding molten glass that comprises establishing a continuous vertical descending stream of molten glass, dividing said stream, receiving the divisions of said stream in a receptacle, periodically accumulating a mass of glass in said receptacle, heating the exterior of said receptacle, periodically reciprocating said receptacle vertically and thereby periodically discharging the accumulated glass through an opening disposed vertically below the said initial continuous stream, and severing mold charges from the glass thus discharged.

11. The method of feeding molten glass, that comprises causing the glass to issue in a continuous stream from a container into a vertically reciprocable receptacle, discharging the glass from said receptacle periodically through a downwardly opening discharge outlet, controlling the issue of glass from said receptacle by the aid of a stationary post disposed within said receptacle, and varying the shape of the issued glass by changing the speed of reciprocation of said receptacle.

In testimony whereof I, the said JOHN R. KELLER, have hereunto set my hand.

JOHN R. KELLER.